United States Patent [19]

Davis

[11] Patent Number: 4,654,948
[45] Date of Patent: Apr. 7, 1987

[54] METHOD FOR RENEWING THE CUTTING FACE OF A DIAMOND DRILL BIT

[75] Inventor: Kenneth Davis, Midland, Tex.

[73] Assignee: W. Wesley Perry, Midland, Tex.

[21] Appl. No.: 803,331

[22] Filed: Dec. 2, 1985

[51] Int. Cl.⁴ .................. B23P 7/00; E21C 13/00
[52] U.S. Cl. .................. 29/402.08; 29/426.2; 29/426.5; 76/101 A; 76/108 A; 175/315; 408/1 BD
[58] Field of Search ............... 29/402.08, 426.5, 426.2; 408/1, 145; 407/40, 72, 102; 76/101 A, 108 R, DIG. 12; 175/315, 329, 383, 410, 413; 279/1 E

[56] References Cited

U.S. PATENT DOCUMENTS

| | | | |
|---|---|---|---|
| 2,348,293 | 5/1944 | Hamer | 29/426.5 |
| 2,429,967 | 10/1947 | Sorensen | 29/426.5 |
| 2,439,692 | 4/1948 | McKay | 29/426.5 |
| 2,557,619 | 6/1951 | Swart | 29/426.5 |
| 2,901,222 | 8/1959 | Pease, Jr. | 175/329 |
| 2,958,119 | 11/1960 | Stansfield et al. | 407/40 |
| 3,075,593 | 1/1963 | Holsing | 175/383 |
| 3,537,539 | 11/1970 | Adcock | 175/413 |
| 3,858,671 | 1/1975 | Kita | 175/410 |
| 4,200,159 | 4/1980 | Peschel et al. | 175/410 |
| 4,553,615 | 11/1985 | Grainger | 175/329 |

Primary Examiner—James M. Meister
Attorney, Agent, or Firm—Marcus L. Bates

[57] ABSTRACT

A drill bit has a formation engaging face through which a plurality of counterbores are formed. A stud assembly having a polycrystalline diamond face thereon is forced into the counterbore in a close tolerance relationship therewith thereby providing frictional forces which prevent movement of the stud assembly respective to the drill bit. A passageway leads from the bottom of the counterbore back to a wall surface of the bit and emerges in spaced relationship respective to the entrance of the counterbore. Hydraulic pressure is effected within the passageway, thereby moving the stud assembly with a piston-like action. The stud assembly is next rotated to bring a new cutting face into cutting position. A tool, made in accordance with the present invention, forces the stud assembly back into the counterbore.

7 Claims, 6 Drawing Figures

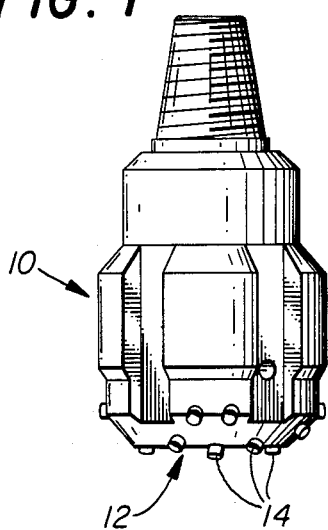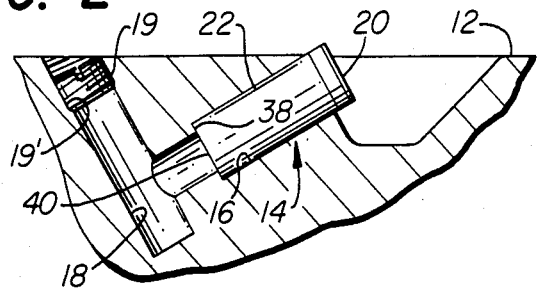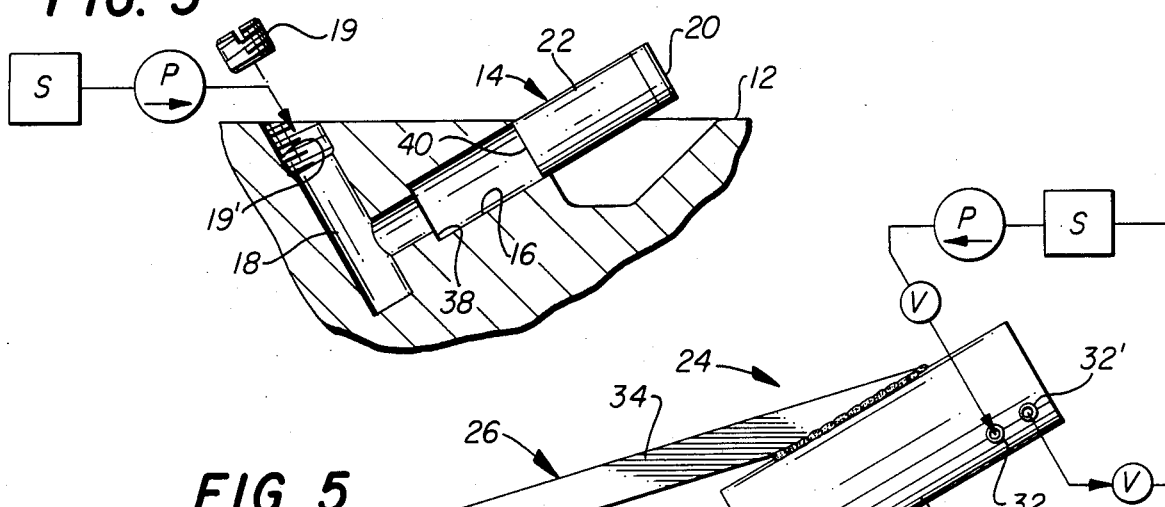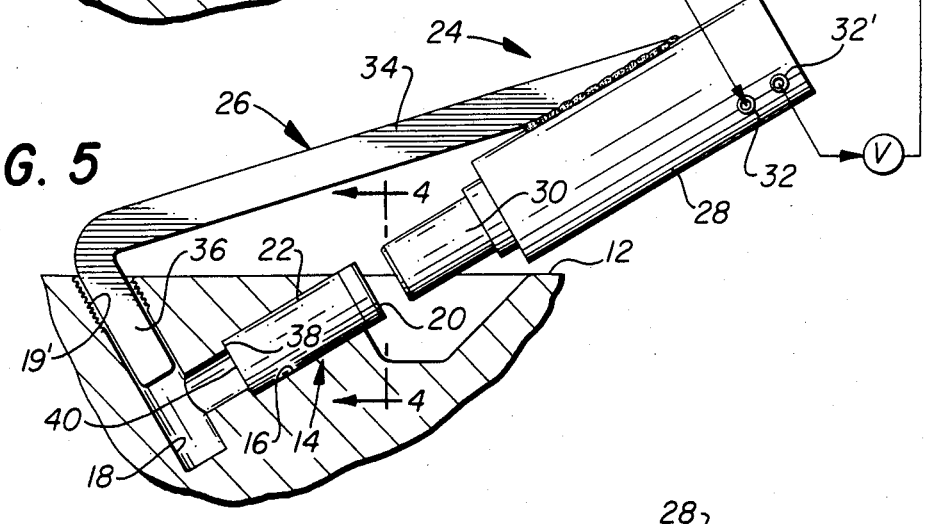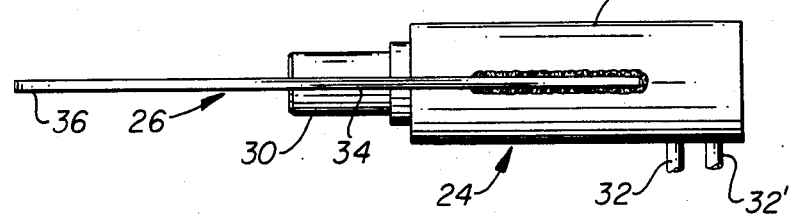

METHOD FOR RENEWING THE CUTTING FACE OF A DIAMOND DRILL BIT

BACKGROUND OF THE INVENTION

This application is a substitute of application Ser. No. 256,891 filed Apr. 23, 1981, now abandoned.

Drill bits which have a cutting face comprised of a plurality of polycrystalline diamond stud assemblies are known to those skilled in the art as evidenced by my co-pending patent applications Ser. No. 803,326, filed Dec. 2, 1985 Ser. No. 803,325 filed Dec. 2, 1985, to which reference is made for further background of this invention.

Attempts have previously been made to remove the stud assembly from the drill bit, rotate the stud assembly to bring a new cutting edge into operative cutting relationship respective to the face of the bit, and thereafter reinstall the same polycrystalline stud assembly. Others skilled in the art have removed an angled stud from the bit and thereafter removed the polycrystalline disc from the stud assembly. The disc is then rotated and reattached to the stud or to a new stud, with an unworn cutting edge oriented to engage the formation. Either of these expedients are time consuming, and therefore expensive.

It would be desirable to be able to easily remove the entire stud assembly from its counterbore, rotate the stud assembly along its longitudinal axial centerline a sufficient amount to cause an unused cutting edge to be brought into cutting relationship respective to the bit face, and thereafter, reinstall the stud assembly within the counterbore. Method and apparatus for carrying out this desirable and unusual drill bit rebuilding technique is the subject of the present invention.

SUMMARY OF THE INVENTION

This invention teaches both method and apparatus by which the cutting efficiency of a drill bit is increased by forcing a damaged stud assembly from the counterbore which extends into the face of the drill bit, rotating the stud assembly along the longitudinal axial centerline thereof until an unused cutting edge has been brought into operative relationship respective to the bit face, and thereafter forcing the stud assembly back into seated relationship within the bit body.

The method of the present invention is carried out by extending a passageway from the surface of the bit into communication with the bottom of the counterbore, with the passageway emerging from the bit body in spaced relationship respective to the entrance of the counterbore. Hydraulic pressure is effected within the passageway, thereby placing a pressure differential across the stud assembly which is of a magnitude to force the stud assembly to move respective to the counterbore. The stud assembly is next rotated along its longitudinal axial centerline until an unused cutting edge is presented respective to the cutting face of the bit; and then the stud assembly is forced back into the counterbore.

A tool made in accordance with the present invention is attached to the bit face by anchoring part of the tool within the passageway. The tool includes a hydraulically actuated ram which moves respective to the anchor device. The ram is placed against the polycrystalline face of the stud assembly so that the stud assembly is forced to move into seated relationship respective to the counterbore.

When the stud assembly has become unduly worn, the old stud assembly can be replaced with a new stud assembly in this same above described manner.

Accordingly, a primary object of the present invention is the provision of method and apparatus by which the cutting efficiency of a diamond drill bit can be improved.

Another object of the present invention is the provision of means by which the cutting edge of the individual stud assemblies of a diamond drill bit can be reoriented or renewed, so that a sharp cutting edge engages the geological formation which the drill bit is penetrating.

A further object of this invention is to provide a means by which the cutting edge of a stud assembly associated with a diamond drill bit can be reoriented to bring a new or unused cutting edge into use.

A still further object of this invention is the provision of a tool by which a stud assembly can be forced into a counterbore located at the cutting face of a diamond drill bit.

Another and still further object of this invention is the provision of a new method by which a stud assembly is forced to move respective to a counterbore within which the stud assembly is seated.

An additional object of this invention is the provision of apparatus by which the stud assembly of a diamond drill bit is forced to move along its longitudinal axial centerline so that the stud assembly can be removed from a counterbore, rotated respective to the drill bit in order to position an unused cutting edge in proper cutting relationship, and thereafter the stud assembly is forced back into seated relationship respective to its counterbore.

These and various other objects and advantages of the invention will become readily apparent to those skilled in the art upon reading the following detailed description and claims by referring to the accompanying drawings.

The above objects are attained in accordance with the present invention by the provision of a method for use with apparatus fabricated in a manner substantially as described in the above abstract and summary.

BRIEF DESCRIPTION OF THE DRAWINGS

FIG. 1 is a perspective side view of a prior art drill bit which can be used in conjunction with the present invention;

FIG. 2 is an enlarged, fragmented, part cross-sectional view of part of the bit disclosed in FIG. 1;

FIG. 3 is a part schematical, part diagrammatical, part cross-sectional view which sets forth part of the method of the present invention;

FIG. 4 is a cross-sectional view taken along line 4—4 of FIG. 5;

FIG. 5 is a fragmentary, part cross-sectional view, similar to FIG. 3, with the method and apparatus of the present invention being carried out in conjunction therewith; and, FIG. 6 is a top view of some of the apparatus disclosed in FIG. 5.

DETAILED DESCRIPTION OF THE PREFERRED EMBODIMENT

FIG. 1 illustrates a prior art diamond drill bit 10 having a cutting face 12 formed at the lower end thereof for engaging a formation, and a threaded connection formed at the opposed or upper end of the bit by which the bit can be threadedly connected to the lower end of a tool string in the usual manner.

FIG. 2 discloses a stud assembly 14 which has been forced into a counterbore 16 of a drill bit with sufficient force such that the stud assembly is telescopingly received within the counterbore until the rear face of the stud assembly has abuttingly engaged the bottom of the counterbore.

As seen in FIGS. 2 and 3, the bottom of the counterbore communicates with a connecting passageway 18, The intersection of the counterbore and passageway is reduced in diameter to form a seat at the bottom of the counterbore. Plug 19 prevents debris from entering passageway 18 while the drill bit is making hole.

In FIGS. 3-5, the stud assembly includes a disc 20 having a polycrystalline diamond layer on the outer face thereof, and having the opposite face thereof firmly bonded to a stud body 22, as more fully described in my co-pending U.S. Pat. No. 4,373,410 issued Feb. 15, 1983.

As specifically shown in FIG. 3, plug 19 has been removed and the illustrated pump is connected to the threaded end 19' of passageway 18. A source of incompressible fluid is forced into passageway 18, thereby forcing the stud assembly to move from its counterbore in the illustrated manner. Any number of fluids can be used as the source; however, it is preferred to use a high pressure grease gun and a heavy grease, although lubricating oils, viscous and non-viscous hydrocarbons, water and water based liquids can advantageously be used in lieu of the heavy axle grease. It is possible to use a compressible fluid, however, there is danger of the stud assembly acting as a projectile and leaving the bit body with great force and velocity, analogous to a bullet fired from a rifle.

In FIG. 4, it will be noted that the stud assembly has been rotated along its longitudinal axial centerline in order to rotationally move or relocate a worn cutting edge 120, and orient an unused cutting edge 220 in cutting relationship respective to the cutting face of the bit.

In FIG. 5, an assembly tool 24, made in accordance with the present invention, is operatively associated with the drill bit. As seen in FIGS. 5 and 6, the assembly tool includes an anchor arm 26 which is affixed to a main body 28. The main body is in the form of a cylinder having a piston 30 reciprocatingly received therewithin. As seen in FIG. 5, inlet and outlet flow conduit connections 32 and 32' provide for a source of hydraulic fluid and fluid return to and from the source S by means of pump P by which the piston 30 is forced to reciprocate within the main body.

The arm includes an extension 34 and an anchor 36. The anchor 36 is of a size to be received within passageway 18, while the piston 30 is oriented respective to the counterbore such that the longitudinal axial centerline of the piston and counterbore lie along a common axis. In FIG. 5, the anchor part of the arm is engaged with the passageway, and the piston 30 has been hydrostatically forced from the cylinder, with the free end of the piston abuttingly engaging the polycrystalline diamond face of the stud assembly, thereby forcing the stud assembly with great force to move into the counterbore of the drill bit. This action forces the stud assembly to move from the position of FIG. 3 into the position of FIG. 5.

The method of the present invention comprises forming a counterbore 16 into a drill bit and forming a passageway 18 which communicates with the bottom of the counterbore with an exterior surface of the bit body at a location removed from the inlet end of the counterbore. A diamond stud assembly 14 is placed within the counterbore.

After the drill bit has been used downhole and the cutting face has become dull, a source of pressure is connected to the passageway and the pressure is increased until the pressure differential across the stud assembly 14 forces the assembly to move with a piston-like action respective to the counterbore 16.

Following this step, an election is made to rotate the stud assembly along its longitudinal axial centerline an amount to bring a new cutting edge 220 into operative cutting relationship respective to the bit cutting face, or alternatively, to remove the stud assembly from the drill bit and substitute another stud assembly therefor. In the event the stud body is to be rotated axially, it is unnecessary to completely remove the stud assembly from the counterbore, so long as the stud assembly has been moved longitudinally a sufficient distance to reduce the frictional forces to an amount which enables the outer marginal end of the stud assembly to be grabbed with a tool and rotated, as for example, by the use of a pair of pliers.

After the stud assembly has been manipulated to provide a new or unused cutting edge at 220, the tool 24 is placed in the operative position illustrated in FIG. 5, conduits 32 and 32' connected to a suitable source of hydraulic pressure, whereupon the piston 30 telescopes from the body 28, thereby forcing the stud assembly into seated relationship respective to the drill bit.

Numeral 38 indicates an annular seat which abuttingly receives the rear face 40 of the stud assembly. When face 40 abuts annular face 38, the stud assembly is considered to be seated within the counterbore 16.

When the stud assembly has been forced out of the counterbore an amount sufficient to enable a marginal end of the stud assembly to be grasped by a tool and rotated about its longitudinal center axis, the stud assembly is considered to have been removed from the counterbore.

The present invention provides improvements in both method and apparatus for removing stud assemblies from diamond drill bits, for installing stud assemblies into diamond drill bits, and for rapidly renewing the cutting efficiency of a diamond drill bit at a very low cost. The bit can be overhauled in the field at very little cost and by the use of the simple and inexpensive tools described herein.

I claim:

1. In a diamond drill bit having a formation engaging face and a plurality of diamond cutter stud assemblies, each stud assembly is mounted in a counterbore at said face for penetrating the earth, the method of increasing the cutting efficiency of the bit comprising the steps of:
   (1) forming a passageway which extends from the bottom of the counterbore and to an external location on the bit, said external location being spaced from an outer end of the counterbore;
   (2) forcing a stud assembly to move out of a counterbore by applying fluid pressure to the passageway connected to the last said counterbore;
   (3) rotating the last said stud assembly about the longitudinal axis thereof to present an unused cutting area of the diamond cutter stud assembly in properly oriented position for engaging a formation;

(4) forcing the stud assembly into operative seated position within the counterbore by connecting a hydraulic piston and cylinder assembly to the drill bit body and stud assembly and forcing the stud assembly to move into the bit body as the piston moves respective to the cylinder.

2. The method of claim 1 and further including the step of connecting the cylinder to an arm and extending the arm into the passageway to prevent the cylinder from moving respective to the bit; and, forcing the piston to move against the stud assembly in order to force the stud assembly into the counterbore.

3. Method of renewing the cutting efficiency of a drill bit having counterbores within which a diamond stud assembly is press-fitted such that the diamond cutting face of the seated stud assembly extends from the counterbore at the formation engaging face of the bit, comprising the steps of:

(1) forming a passageway which communicates the seated end of the seated stud assembly with the outer surface of the bit;

(2) applying fluid pressure within said passageway of a magnitude to force the stud assembly to telescopingly move respective to the counterbore;

(3) placing a stud assembly within the outer marginal end of the counterbore and orienting the cutting end to present an unused cutting edge at the cutting face of the bit;

(4) forcing the stud assembly into seated relationship respective to the counterbore by connecting a hydraulic piston and cylinder assembly between the drill bit body and stud assembly, and forcing the stud assembly to move into the bit body while the piston is forced to move respective to the cylinder.

4. The method of claim 3, and further including the step of connecting the cylinder to an arm and extending the arm into the passgeway to prevent the cylinder from moving respective to the bit; and, forcing the piston to move against the stud assembly and to push the stud assembly into the counterbore.

5. Method of removing and replacing polycrystalline diamond stud assemblies of a drill bit so that a different and unused cutting edge is operatively oriented respective to the bit face, comprising the steps of:

(1) forming a counterbore within the drill bit body for receiving a stud assembly in close tolerance relationship therewithin;

(2) forming a passageway which communicates the bottom of the counterbore with the exterior of the bit body, with the end of the counterbore and the end of the passageway being spaced apart from one another;

(3) applying fluid pressure to the passageway and increasing the pressure until the stud assembly moves along the longitudinal axial centerline thereof and out of said counterbore;

(4) forcing a stud assembly into the counterbore, with the cutting face of the stud assembly being oriented to present an unused cutting edge at the cutting face of the bit;

(5) carrying out step (4) by connecting a hydraulic piston and cylinder assembly to the drill bit body and stud assembly, and forcing the stud assembly to move into the bit body as the piston is forced to move respective to the cylinder.

6. The method of claim 5 wherein a new stud assembly is used in step (4).

7. The method of claim 5 wherein a used stud assembly is used in step (4).

* * * * *